United States Patent
Ranjith Reddy et al.

(10) Patent No.: US 9,582,199 B2
(45) Date of Patent: Feb. 28, 2017

(54) METHOD AND AN APPARATUS FOR ANALYZING DATA TO FACILITATE DATA ALLOCATION IN A STORAGE DEVICE

(71) Applicant: SAMSUNG ELECTRONICS CO., LTD., Suwon-si, Gyeonggi-do (KR)

(72) Inventors: Basireddy Ranjith Reddy, Bangalore (IN); Chirumamilla Narendra, Bangalore (IN); Talawar Prakash, Bangalore (IN); V R Chaitanya Kavirayani, Bangalore (IN); Panwar Narender Pal Singh, Bangalore (IN)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 267 days.

(21) Appl. No.: 14/204,333

(22) Filed: Mar. 11, 2014

(65) Prior Publication Data
US 2014/0289492 A1  Sep. 25, 2014

(30) Foreign Application Priority Data
Mar. 19, 2013  (KR) .................. 10-2013-0029113

(51) Int. Cl.
*G06F 12/00* (2006.01)
*G06F 3/06* (2006.01)

(52) U.S. Cl.
CPC ............ *G06F 3/0613* (2013.01); *G06F 3/061* (2013.01); *G06F 3/064* (2013.01); *G06F 3/0643* (2013.01); *G06F 3/0653* (2013.01); *G06F 3/0671* (2013.01); *G06F 3/0673* (2013.01)

(58) Field of Classification Search
CPC ...... G06F 3/0653; G06F 3/0643; G06F 3/064; G06F 3/0613; G06F 3/061; G06F 3/0673; G06F 3/0671; G06F 17/30
See application file for complete search history.

(56) References Cited

U.S. PATENT DOCUMENTS

| | | | | |
|---|---|---|---|---|
| 5,331,613 | A * | 7/1994 | Yamada | G06F 3/0601 369/30.26 |
| 8,078,653 | B1 * | 12/2011 | Bisson | G06F 17/30864 707/641 |
| 8,621,145 | B1 * | 12/2013 | Kimmel | G06F 12/0246 711/103 |
| 2007/0124547 | A1 * | 5/2007 | Bedi | G06F 3/0613 711/154 |
| 2008/0215800 | A1 * | 9/2008 | Lee | G06F 3/0613 711/103 |

(Continued)

FOREIGN PATENT DOCUMENTS

| | | |
|---|---|---|
| KR | 10-1101324 | 12/2011 |
| KR | 1020120093608 | 8/2012 |

*Primary Examiner* — Larry Mackall
(74) *Attorney, Agent, or Firm* — F. Chau & Associates, LLC

(57) ABSTRACT

A method for data allocation in a storage device includes performing an analysis on current and past Input/Output (I/O) requests to access data in the storage device, the analysis yielding an output comprising a hotness of data and an access pattern of data associated with a file in the storage device, wherein the hotness and the access pattern are obtained by monitoring a working set of files in the storage device with respect to the I/O requests, and updating an allocation of data in the storage device based on the output of the analysis.

17 Claims, 9 Drawing Sheets

(56) References Cited

U.S. PATENT DOCUMENTS

| | | |
|---|---|---|
| 2010/0017555 A1 | 1/2010 | Chang et al. |
| 2010/0161780 A1 | 6/2010 | Lee et al. |
| 2011/0055464 A1 | 3/2011 | Moon et al. |
| 2011/0138115 A1 | 6/2011 | Oh et al. |
| 2011/0191521 A1* | 8/2011 | Araki .................. G06F 12/0246 711/103 |
| 2011/0264843 A1 | 10/2011 | Haines et al. |
| 2012/0203809 A1* | 8/2012 | Kim .................. G06F 17/30194 707/827 |
| 2012/0221778 A1 | 8/2012 | Doatmas et al. |
| 2013/0046917 A1* | 2/2013 | Yang .................. G06F 12/0246 711/103 |

* cited by examiner

METHOD AND AN APPARATUS FOR ANALYZING DATA TO FACILITATE DATA ALLOCATION IN A STORAGE DEVICE

CROSS-REFERENCE TO RELATED APPLICATION

This U.S. non-provisional application claims priority under 35 U.S.C. §119 to Korean Patent Application No. 10-2013-0029113, filed on Mar. 19, 2013, in the Korean Intellectual Property Office, the disclosure of which is incorporated by reference herein in its entirety.

TECHNICAL FIELD

The present inventive concept relates to a method and an apparatus for analyzing data to facilitate data allocation in a storage device.

DISCUSSION OF THE RELATED ART

Allocating data and caching is performed in computing devices. Optimized data allocation increases Input/Output (IO) throughput efficiency in storage devices. Most computer file systems presume that the storage devices do not have functional relevance in a data allocation policy. It may be perceived that storage device drivers, file systems and the storage devices are devoid of such collaborative functionality while allocating data for efficient access/retrieval. For example, the storage device drivers may be installed for facilitating usage of the storage devices in a computer, the file systems may be used for managing data at different levels (e.g., File, Block, Page etc.) in the computer, and the storage devices may be Solid State Devices (SSDs) that are capable of storing data. Examples of SSDs include memory cards used in computing devices and other electronic goods. Further, the storage devices may include conventional hard disks, or storage devices with a circular disc for reading, writing, and rewriting.

SUMMARY

An exemplary embodiment of the present inventive concept determines hotness of data in a storage device by monitoring a working set of files.

Another exemplary embodiment of the present inventive concept accesses patterns of various files or working sets of files in a storage device by monitoring the working set of files.

Another exemplary embodiment of the present inventive concept predicts a future Input/Output (I/O) request with respect to files or working sets in a storage device using various statistical and probabilistic models.

In an exemplary embodiment of the present inventive concept, a method for data allocation in a storage device is provided. The method includes the steps of performing an analysis on current and past Input/Output (I/O) requests to access data in the storage device, the analysis yielding an output comprising a hotness of data and an access pattern of data associated with a file in the storage device, wherein the hotness and the access pattern are obtained by monitoring a working set of files in the storage device with respect to the I/O requests, and updating an allocation of data in the storage device based on the output of the analysis.

The working set includes files that are requested through the current I/O requests.

Performing the analysis on the current and the past I/O requests includes: extracting metadata of the file; determining a format of the file from the metadata; and determining the hotness based on the format of the file.

The method further includes ascertaining data as COLD when the format of the file is included in a COLD category.

The method further includes: retrieving metadata of the file; updating a frequency of access of a Logical Block Address (LBA) in response to the current I/O request; retrieving a maximum frequency of the file, the maximum frequency including a count of a maximum number of accesses attempted for a block among all blocks within the file; retrieving a maximum frequency of the working set, the maximum frequency of the working set including a highest frequency among the files within the working set; and computing a hotness level of data based on the updated frequency of access, and at least one of the maximum frequency of the file and the maximum frequency of the working set.

Computing the hotness level of data includes: computing relative hotness of the LBA by using the updated frequency of access, the maximum frequency of the file, and the maximum frequency of the working set; and computing absolute hotness of the LBA by the using the updated frequency of access and a maximum frequency of the storage device, wherein the maximum frequency of the storage device includes a frequency of access of the most highly accessed data in the storage device.

The method further includes determining hot spots within the file based on the count of the maximum number of accesses.

Updating the frequency of access of the LBA includes: updating a frequency of pages of the file when a size of the current I/O request is small; and updating a frequency of blocks of the file when a size of the current I/O request is large.

Performing the analysis on the current and the past I/O requests includes dynamically updating the working set, the working set including updated metadata of active files accessed by applications of a host system.

Dynamically updating the working set includes: determining one or more statistical parameters including mean, standard deviation, maximum values of frequency of accesses, and average size of the I/O request, wherein the one or more statistical parameters is determined for pages and blocks of the files in the working set; and appending data of the one or more statistical parameters for the pages and blocks of the files in the working set.

The method further includes: plotting a histogram based on the frequency of access information of a logical block address (LBA) in the file; and determining an access pattern of the file as sequential large, sequential small, random large, or random small based on the histogram and the one or more statistical parameters.

The method further includes predicting a next I/O request based on the access pattern of data and a probability distribution function of a logical block address (LBA) range.

The method further includes: queuing the I/O requests and associated metadata; sending the metadata associated with each of the I/O requests in the order of the queue, the metadata including one or more statistical parameters; and sending the I/O requests in the order of the queue.

The analysis is performed in the storage device.

The analysis is performed at a computing device connected to the storage device.

In another exemplary embodiment of the present inventive concept, an apparatus for data allocation in a storage device is provided. The apparatus includes a processor, and a memory connected to the processor. The memory includes a storage subsystem configured with one or more programs, wherein the storage subsystem instructs the processor to perform steps including performing an analysis on current and past Input/Output (I/O) requests to access data in the storage device, the analysis yielding an output comprising a hotness of data and an access pattern of data associated with a file in the storage device, wherein the hotness and the access pattern are obtained by monitoring a working set of files in the storage device with respect to the I/O requests, and updating an allocation of data in the storage device based on the output of the analysis.

In an exemplary embodiment of the inventive concept, a method of data allocation in a storage device includes: determining a category of data associated with an input/output (I/O) request, wherein the data has a first category when it is expected to be frequently updated and the data has a second category when it is expected to be less frequently updated; determining a frequency of access of a logical block address (LBA) associated with the I/O request and LBAs associated with past I/O requests; determining an access pattern for ranges of the LBAs based on the frequency of accesses; determining a category and an access pattern for files in the storage device by using the determined category of data and the frequency of accesses; and using the determined category and access patterns for the files in the storage device to allocate data.

BRIEF DESCRIPTION OF THE DRAWINGS

The foregoing and other features of the inventive concept will become more apparent by describing in detail exemplary embodiments thereof with reference to the accompanying drawings.

DETAILED DESCRIPTION OF THE EMBODIMENTS

Exemplary embodiments of the present inventive concept will now be described more fully hereinafter with reference to the accompanying drawings. This inventive concept may, however, be embodied in different forms and should not be construed as limited to the embodiments set forth herein. The same reference numbers may indicate the same elements throughout the specification and drawings.

Figure 1:
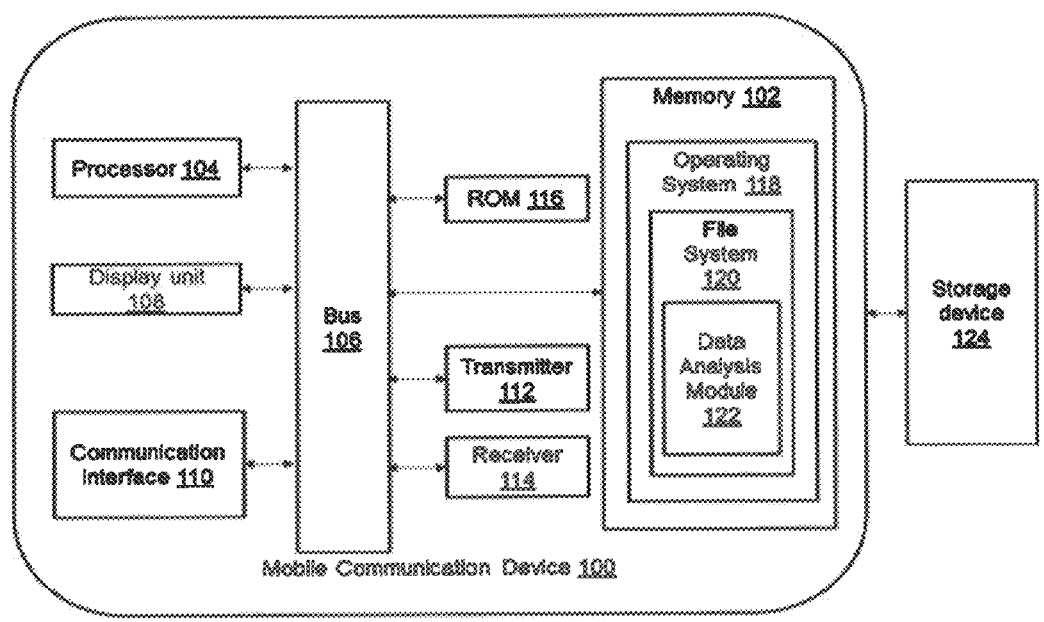
FIG. 1 illustrates a computing device in accordance with an exemplary embodiment of the present inventive concept.

FIG. 1 illustrates a computing device 100 in accordance with an exemplary embodiment of the present inventive concept. The computing device 100 may be a mobile computing device but it is not limited thereto.

In accordance with the present exemplary embodiment of the inventive concept, the computing device 100 includes a memory 102, a processor 104, a bus 106, a display unit 108, a communication interface 110, a transmitter 112, a receiver 114, and a Read Only Memory (ROM) 116. The memory 102 includes an operating system 118. The operating system 118 is responsible for executing instructions that are stored in the memory 102. A file system 120, in accordance with an exemplary embodiment of the inventive concept, is configured to perform functions related to file management in the operating system 118.

Further in the present exemplary embodiment of the inventive concept, a data analysis module 122 present in the file system 120 is configured for performing an analysis on current and past Input/Output (I/O) requests to access data. The analysis yields an output including information on hotness of data and an access pattern of data in a storage device associated with a file. The hotness and the access pattern are obtained by monitoring a working set of files with respect to the I/O requests in the storage device. Thereafter, an update on the allocation of data is implemented in the storage device based on the output of the analysis by the data analysis module 122. In an exemplary embodiment of the inventive concept, the data analysis module 122 is present in a storage sub-system coupled with the memory 102. The storage sub-system may be an internal storage system of the computing device 100 or an external storage system that is connected to the computing device 100.

The memory 102 and the ROM 116 may be volatile memory and non-volatile memory. A variety of computer-readable storage media may be stored in and accessed from the memory elements. Memory elements may include any memory device(s) for storing data and machine-readable instructions, such as a read only memory, a random access memory, an erasable programmable read only memory, an electrically erasable programmable read only memory, a hard drive, a removable media drive for handling compact disks, digital video disks, diskettes, magnetic tape cartridges, memory cards, Memory Sticks, and the like. The data analysis module 122 may also be stored in the form of machine-readable instructions on any of the above-mentioned storage media. The machine-readable instructions may also be stored on a computer program, which when executed by the processor 104 perform a data analysis, according to exemplary embodiments of the present inventive concept. In an exemplary embodiment of the inventive concept, the computer program may be included on a compact disk-read only memory (CD-ROM) and loaded from the CD-ROM to a hard drive in the non-volatile memory.

Other components such as the display unit 108, the communication interface 110, the transmitter 112, and the receiver 114 may be of any type for use with a computing device and will not be explained further. Further, the computing device 100 is connected to a storage device 124. The computing device 100 is capable of performing data management.

Figure 2:
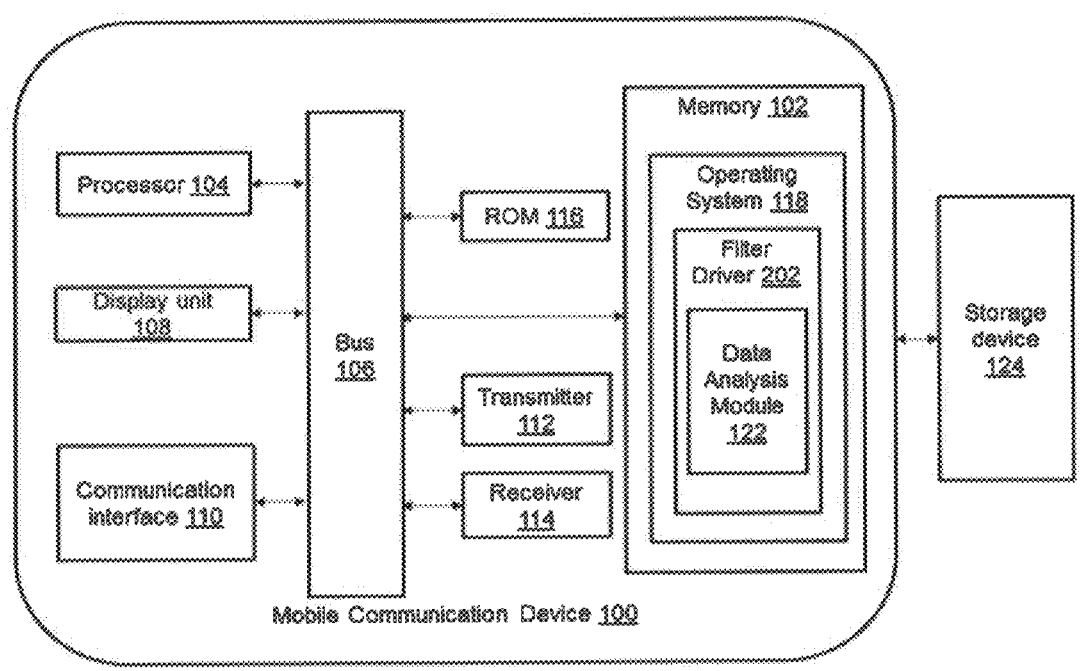
FIG. 2 illustrates a computing device in accordance with another exemplary embodiment of the present inventive concept.

FIG. 2 illustrates a computing device 100 in accordance with another exemplary embodiment of the present inventive concept.

In accordance with the present exemplary embodiment of the inventive concept, the data analysis module 122 is present in a filter driver 202. The filter driver 202 may be installed along with the operating system 118 of the computing device 100 in an exemplary embodiment of the inventive concept. The filter driver 202 may be configured to enable external memory devices (such as the storage device 124) to be read in the computing device 100. The data analysis module 122 present in the filter driver 202 is configured to perform an analysis on current and past I/O requests to access data. The analysis yields an output including information on hotness of data and an access pattern of data in the storage device 124 associated with a file.

Other components of the computing device 100 of FIG. 2 are explained with reference to FIG. 1 and will not be explained further.

Figure 3:
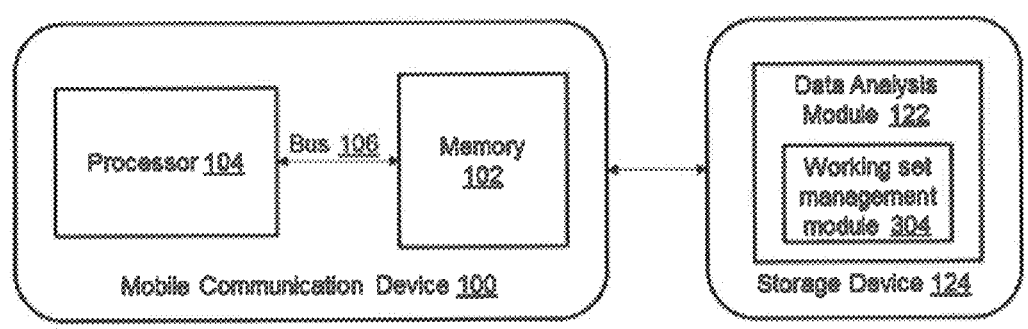
FIG. 3 illustrates a computing device in accordance with another exemplary embodiment of the present inventive concept.

FIG. 3 illustrates a computing device 100 in accordance with another exemplary embodiment of the present inventive concept.

In accordance with the present exemplary embodiment of the inventive concept, the computing device 100 is connected to the storage device 124. The data analysis module 122 is configured in the storage device 124. In accordance with the present exemplary embodiment of the inventive concept, the data analysis module 122 includes a working set management module 304. The working set management module 304 manages files related to current or recent I/O requests that are received at the storage device 124.

Figure 4:
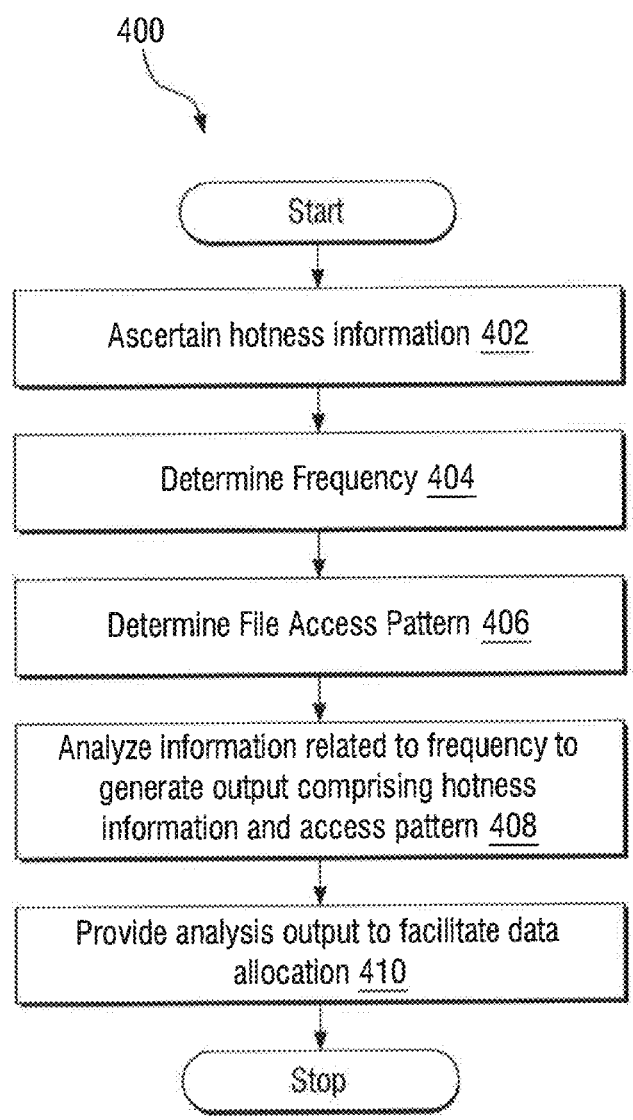
FIG. 4 is a flow chart illustrating a method of analyzing data to facilitate allocation of data in a storage device, in accordance with an exemplary embodiment of the present inventive concept.

FIG. 4 is a flow chart illustrating a method 400 for analyzing data to facilitate allocation of data in the storage device 124, in accordance with an exemplary embodiment of the present inventive concept.

The method 400 includes a plurality of steps for analyzing data. The method 400 starts with a primary step 402 of ascertaining hotness of data associated with an I/O request. For example, hotness information of the I/O request is sent in the form of hotness levels (e.g., 0-255) to the storage device 124. For example, a lower Hotness Level indicates less frequently updated data (e.g., COLD) and a higher Hotness Level indicates most frequently updated data (e.g., HOT). At step 404, the frequency of access for each Logical Block Address (LBA) associated with the current and past I/O requests are determined. Based on the frequency of access for each of the files, an access pattern is determined for each LBA range (step 406). Thereafter, at step 408, the hotness information of the file and the frequency of access is used to perform an analysis and determine a hotness level and access pattern for all the files that are present in the storage device 124. At step 410, the output of the analysis is used for optimized data allocation in the storage device 124.

Figure 5A:
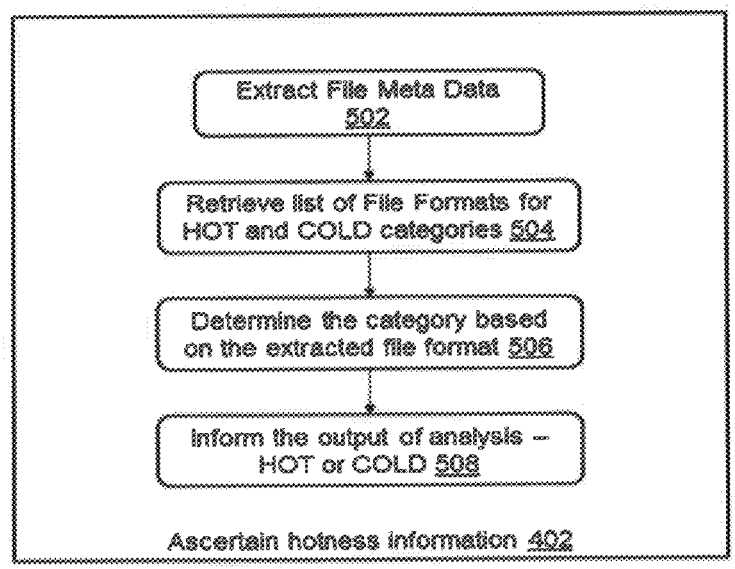
FIG. 5a is flow chart depicting a method to ascertain hotness of data in accordance with an exemplary embodiment of the present inventive concept.

FIG. 5a is flow chart depicting a method to ascertain hotness of data in accordance with an exemplary embodiment of the present inventive concept.

In accordance with the present exemplary embodiment of the inventive concept, the step 402 of FIG. 4 that is directed to ascertaining hotness information is depicted. The step 402 includes sub-steps to ascertain hotness information. Initially, at step 502, metadata of a file is extracted for which the I/O request is sent. In an exemplary embodiment of the inventive concept, the data analysis module 122 includes stored hot and cold patterned information of the files. At step 504, a list of file formats that are stored previously are retrieved. In an exemplary embodiment of the inventive concept, the file is stored as having cold pattern when the file is among file types which are read only, write once and read many times. Some of the file types that belong to a cold category are JPG, JPEG, BMP, GIF, PNG, TIF, TIFF, JP2, DCR, RAW, JFIF, JPE, MP3, WMA, AAC, IFF, WMV, WAV, MID, MIDI, AIF, AU, AVI, CDA, RA, M3U, FLAC, MP4, MPG, MSV, QCP, RMI, OGM, 3GP, 3GPP, 3G2, ASF, AVI, ASX, FLV, RM, RMVB, SWF, MPEG, MOV, DIVX, XVID, DAT, FLC, OGG, VOB, MKV, MOI, VGZ, and VID. Further, the file is stored as having the hot pattern when the file is among file types which are frequently updated. Examples of files belonging to a hot category are LOGFILE, MFT, BITMAP, DIRECTORY, ETL, EVTX, PF, and LOG. In solid state storage devices, such as the storage device 124, the files when represented as data and data present in the storage device 124 are in the form of blocks and pages. For non-cold category files, a frequency of access table for the pages and blocks is maintained. At step 506, the category of the file for which the I/O request is determined based on the file format (e.g., obtained from metadata extracted at step 502). For example, if the data analysis module 122 is present in the storage device 124 as illustrated in FIG. 3, then the storage device 124 is informed of the determined file format (step 508).

Further, in an exemplary embodiment of the inventive concept, another category of files in the storage device 124 may be present. These may have an unknown pattern. The unknown pattern is of the file types which may not fall in the two categories (e.g., hot and cold). Such file types are called as unknown. These types may be frequently updated or read only. Some examples of the category unknown are C, CPP, TXT, DOC, XLS, DOCX, PPT, PPTX, and XLSX. Further, the frequency of access table for pages and blocks is maintained for these file types.

Figure 5B:
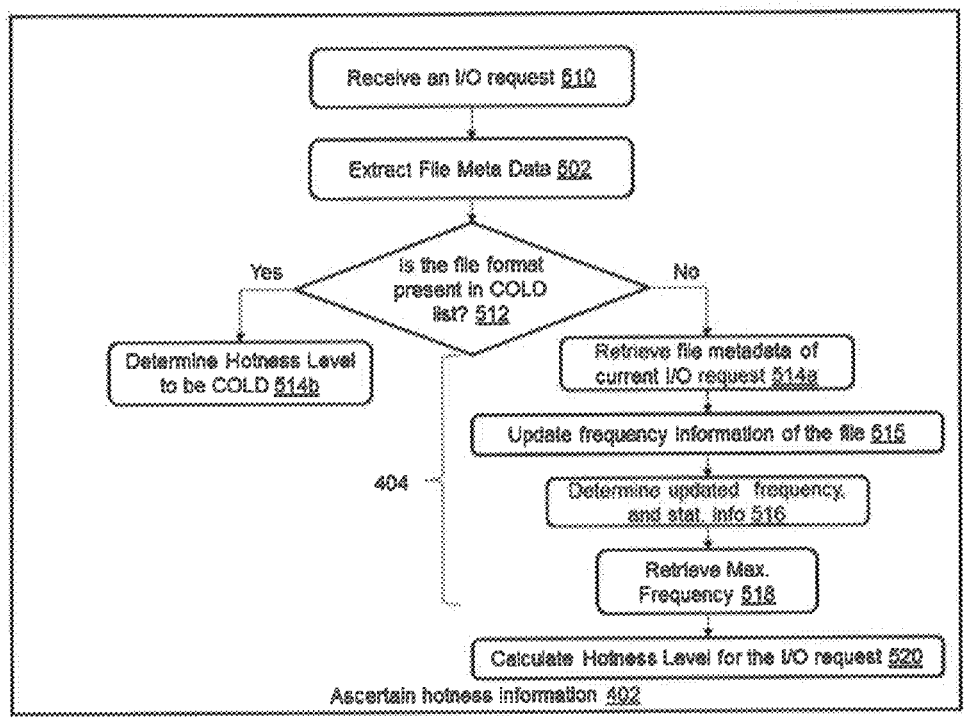
FIG. 5b is a flow chart depicting a method to ascertain hotness of data in accordance with another exemplary embodiment of the present inventive concept.

FIG. 5b is a flow chart depicting a method to ascertain hotness of data in accordance with another exemplary embodiment of the present inventive concept. In other words, FIG. 5b depicts sub steps involved in determining or ascertaining a hotness level for each of the I/O requests, in step 402 of FIG. 4. At step 510, the I/O request is received at the computing device 100 to access a file present in the storage device such as 124. The data analysis module 122, at step 502, extracts metadata of all the files that are present in the storage device 124. At step 512, as shown in FIG. 5b, it is determined whether the requested file format is a cold format. If yes, at step 514b the determination of the hotness information (402) ends. If the file format is not present in cold format, at step 514a, file metadata is retrieved for the file requested in the I/O request. The number of accesses for each of the LBA ranges or pages or blocks (e.g., frequency of access) is updated at step 515 on receiving the current I/O request. Initially, a range that is associated with files of the current I/O request is determined and, upon receipt of the I/O request, the frequency of corresponding entries (e.g., pages/blocks) based on the LBA range is incremented by '1'. Further in an exemplary embodiment of the inventive concept, a block number that is used to identify a particular block in the LBA is a quotient obtained when a number identifying the LBA is divided by a number of blocks present in the device, for example, the storage device 124. In an exemplary embodiment of the inventive concept, a page number (e.g., identifier of the page) corresponding to a block is a remainder when divided by the LBA with the number of pages in the block.

At step 516, an updated frequency and one or more statistical parameters are determined for each of the pages or blocks associated with the file corresponding to the I/O request. A maximum frequency is retrieved at step 518. The maximum frequency may refer to two different values such as a file maximum frequency and a working set maximum frequency.

The value of the file maximum frequency may refer to the frequency of a page or block with the highest number of accesses associated with the file. The value of the working set maximum frequency may refer to the highest frequency of a file among the working set (e.g., the set of files that are recently requested/accessed). In an exemplary embodiment of the inventive concept, the working set may include a set of files that are currently requested/accessed. At step 520, a hotness level is computed with the frequency information of the file with respect to others. The computation of the hotness level is illustrated here:

For example, consider a working set "A" with files (e.g., A1, A2, A3, A4, and A5) that has a maximum frequency represented by 'Max A' among the files and that was active at a time "T1". The 'Max A' may refer to the maximum frequency of access of a page or a block or an LBA range associated with the file.

In the same example, consider there is an I/O request received to access a block with an LBA range belonging to file 'A2'. A hotness level is computed for the I/O request of 'A2'. It may imply that the hotness of the I/O request is compared with the hotness of maximum frequency in the current working set. The relative hotness, in accordance with the present exemplary embodiment of the inventive concept, can be computed by:

Relative hotness level of the I/O request on this LBA, A2=(frequency at LBA range*256)/Max A.

In an exemplary embodiment of the inventive concept, 'frequency of LBA range' may refer to a frequency which is the highest among frequencies of all blocks or pages associated with that LBA range of the file.

Further, in another exemplary embodiment of the inventive concept, hotness level detection can be performed based on combining the frequency of a page and how recent the file is accessed. The step may be illustrated with an illustrative formula for computing relative hotness, as shown by:

Relative hotness level=((frequency at LBA range*255)/(File Maximum Frequency))+((File Maximum Frequency*255)/Working set Maximum Frequency)/2).

The term 'File Maximum Frequency' may refer to the maximum frequency (e.g., highest frequency of access) associated with the file, 'A2'.

In another exemplary embodiment of the inventive concept, the absolute hotness of the I/O request is determined. The absolute hotness for the I/O request is determined by:

Absolute hotness of the I/O request=(frequency at LBA range*256)/'Maximum A'.

Where, 'Maximum A' is a highest frequency of access value among all the files present in the storage device 124 at any point of time.

Figure 6:
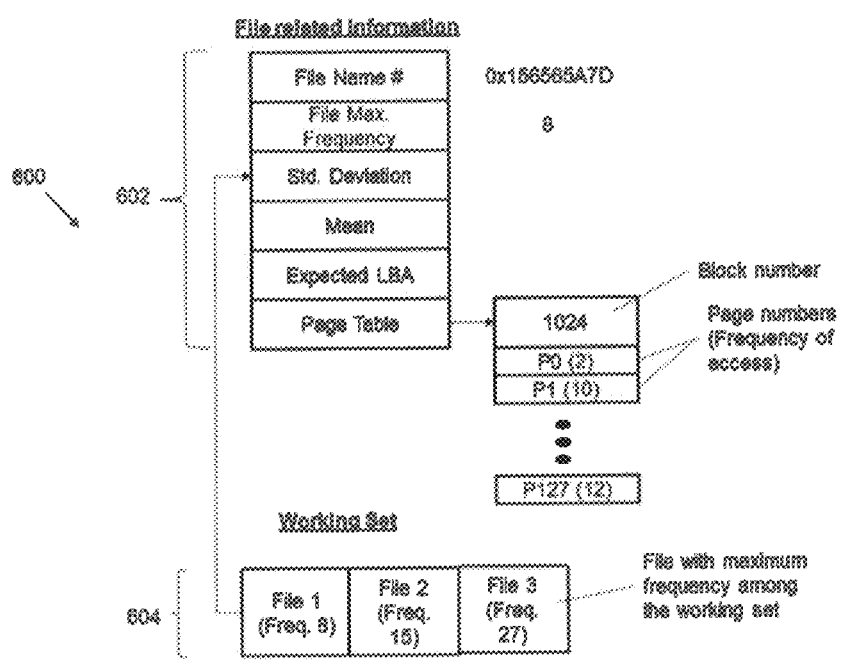
FIG. 6 is a schematic view of a file node structure of a file present in a storage device, in accordance with an exemplary embodiment of the present inventive concept.

FIG. 6 is a schematic view of a file node structure 600 of a file present in the storage device 124, according to an exemplary embodiment of the inventive concept.

The file node structure 600 provides details of the file at 602 such as file name (e.g., 0x156565A7D), file maximum frequency (e.g., 8), standard deviation, mean, expected LBA, and Page table. The Page Table may include a block number 1024, and page numbers along with their frequency of access (e.g., P0 (2) indicates page number 0 with an access frequency of 2). 604 denotes a set of files representing a working set in accordance with an exemplary embodiment of the inventive concept. Each of the files of the working set is shown with file maximum frequency (e.g., File 1 (Freq. 8), File 2 (Freq. 15) and File 3 (Freq. 27)) from which the working set maximum frequency is determined. This information may be used in determining a hotness level. In an exemplary embodiment of the inventive concept, the working set is dynamically updated, wherein the updated working set represents updated metadata of active files accessed by applications of a host system, the host system being the computing device 100, for example. Further, in an exemplary embodiment of the inventive concept, when a file node is deleted from a working set, all page tables, and block tables associated with file are deleted and no maximum frequency is maintained.

When a first I/O request is received to access a file such as 'Temp.doc', a corresponding Block number 1024 (shown in FIG. 6) and Page number 2 is computed and the frequency in the Page is updated to 10.

For instance, the hotness level for the I/O request in this example requires 'Working Set Max Frequency' (example value=27), 'maximum hotness level indications supported' (example value=255), 'Page Frequency associated with current I/O request' (example value=10) and is given by one of the illustrative formulae: hotness level=(10*255)/27=85.

Figure 7:
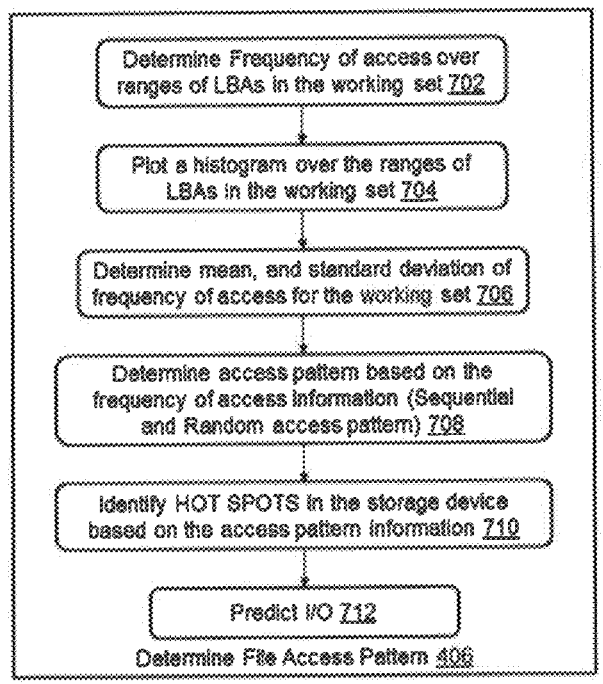
FIG. 7 is a flow diagram illustrating a method to determine a file access pattern in a storage device, in accordance with an exemplary embodiment of the present inventive concept.

FIG. 7 is a flow diagram illustrating the step 406 in which a file access pattern in the storage device 124 is determined, in accordance with an exemplary embodiment of the present inventive concept.

The step 406 includes a number of sub-steps. A file, includes a number of ranges of LBAs within the storage device 124. At step 702, a frequency of access of the LBA ranges of the working set is determined. Thereafter, a histogram is plotted with a frequency of access of the LBA ranges at step 704. Statistical parameters such as Mean, Median, and Standard Deviation are computed based on the plotted histogram; in step 706. The frequencies of access data collected are used to determine the statistical parameters such as Mean, Median, and Standard Deviation. Access patterns (e.g., patterns of I/O requests) of the LBA ranges of the files in the working set are determined at step 708. Based on the access patterns, as determined, hot spots within the storage device 124 and within the files can be determined in step 710.

Further, the access pattern of the LBAs provides insight on some of the pages of the file being most frequently accessed by the user of the storage device 124. For example, the file can be categorized based on the access patterns as 'sequential large', 'random large', 'sequential small', and 'random small'. However, other categories may be used. The access patterns as determined can be used to predict future I/O requests; in step 712. In an exemplary embodiment of the inventive concept, if the determined access pattern is sequential large, and if the current I/O request is at LBA 10 and I/O size 5, the next I/O request may be predicted to be at LBA 15 and I/O size 5.

Figure 8:
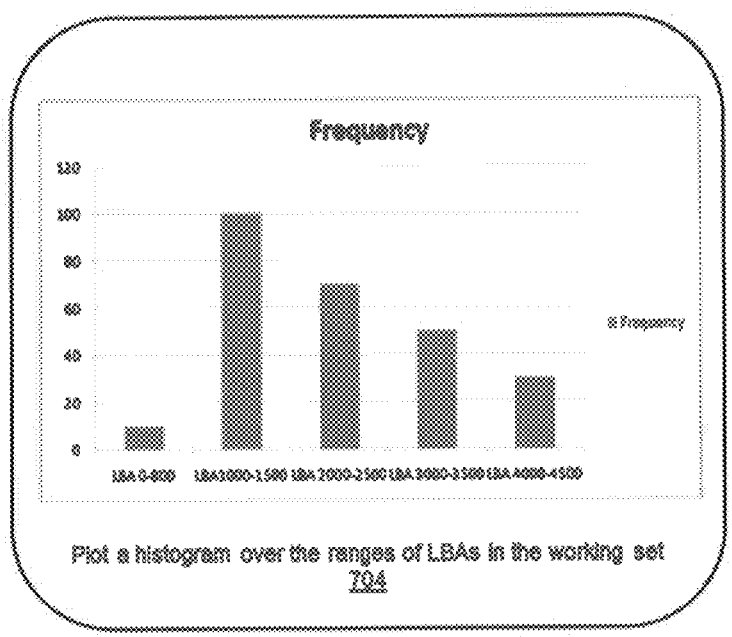
FIG. 8 is a histogram depicting frequency of access of a file over a Logical Block Address (LBA) range in a storage device, according to an exemplary embodiment of the inventive concept.

FIG. 8 is a histogram depicting frequency of access of a file over an LBA range in a storage device, according to an exemplary embodiment of the inventive concept.

The step 704, as explained with reference to FIG. 7 is illustrated in the present exemplary embodiment of the inventive concept. The data analysis module 122 is capable of retrieving this histogram and derives hot spots that are present in the storage device 124. Thereafter, the output can be used for a better allocation policy in the storage device 124.

In an exemplary embodiment of the inventive concept, a sequential access pattern is derived from such plotted histograms, as in FIG. 8. For example for the file with the LBA range, a histogram of frequency vs. LBA ranges is plotted. For a sequential access of the file, the LBA ranges which belong to the file have the same frequency for all the blocks that has been accessed by user(s) of the storage device 124. Getting a mean and standard deviation of the given frequency over the current working set of LBA's gives certain statistical parameters such as Mean $\mu=1$ and Standard deviation $\sigma=0$. Hence, to obtain insight over the present access patterns, it can be understood that a standard deviation of frequency for sequentially accessed LBAs that are allocated to the file can be approximately '0'.

Further, as an example, by inferring that the file is sequential, the blocks in these files can be referred to as "COLD" and the storage device 124 can allocate permanent blocks for the same. This is an optimization in data allocation policy. Furthermore, this assumption of inferring files to be 'COLD' may be wrong if files are accessed in a circular buffer manner. For example, when the file reaches a certain size in the storage device 124, the application may start from a first allocated LBA range again. This type of file, i.e., having circular buffer access, can also be detected since the difference in the frequency from the existing LBA ranges may be always '1'.

In another example, a random access pattern can be arrived at with the help of a plotted histogram. There can be many different types of random access patterns and they may be classified in a more appropriate category than just "random access" such as random small and random large. In an exemplary embodiment of the inventive concept, such small and large classifications for the random access patterns are determined by comparing the sizes of the I/O request with an average I/O request at the LBA range. Furthermore, a frequency of pages of the file of the I/O request are updated when the size of the I/O request is small, and a frequency of blocks of the file of the I/O request are updated when the size of the I/O request is large.

For example, the size of the I/O request is computed as follows.

Average Size of an I/O request=(Average size of I/O request*(number of I/O requests received at an LBA range)+size of a current I/O request)/(number of I/O requests received at an LBA range+1).

More numbers of classes can be defined based on the average size of the I/O request of all the requests received for the file. For example, when a mean and a standard deviation of the given frequency of access over the working set of LBA's are $\mu=30$ and $\sigma=45.83$, it may be noted that the standard deviation for the given set of frequencies is quiet high from which it can be inferred that the given file access pattern is random. "HOT SPOTS" may also be found within the frequency distribution. For example, if '$\sigma$' is more than a threshold and a maximum frequency is higher than an average frequency, it may be identified as hot spot.

Through use of such statistical insights, improved life and endurance of the storage device 124 can be achieved. This is achieved by segregating the hot data and cold data separately in the storage device 124 to consolidate invalid data in one area and valid data in another area. For this, a hotness aware garbage collector can be configured within the storage device 124. By making use of the hotness information, cold data can be assigned to worn-out blocks of the storage device 124, and if the storage device 124 is a flash memory, hot data can be assigned to blocks with more numbers of write or erase cycles. This eventually increases life of the storage device 124.

Figure 9:
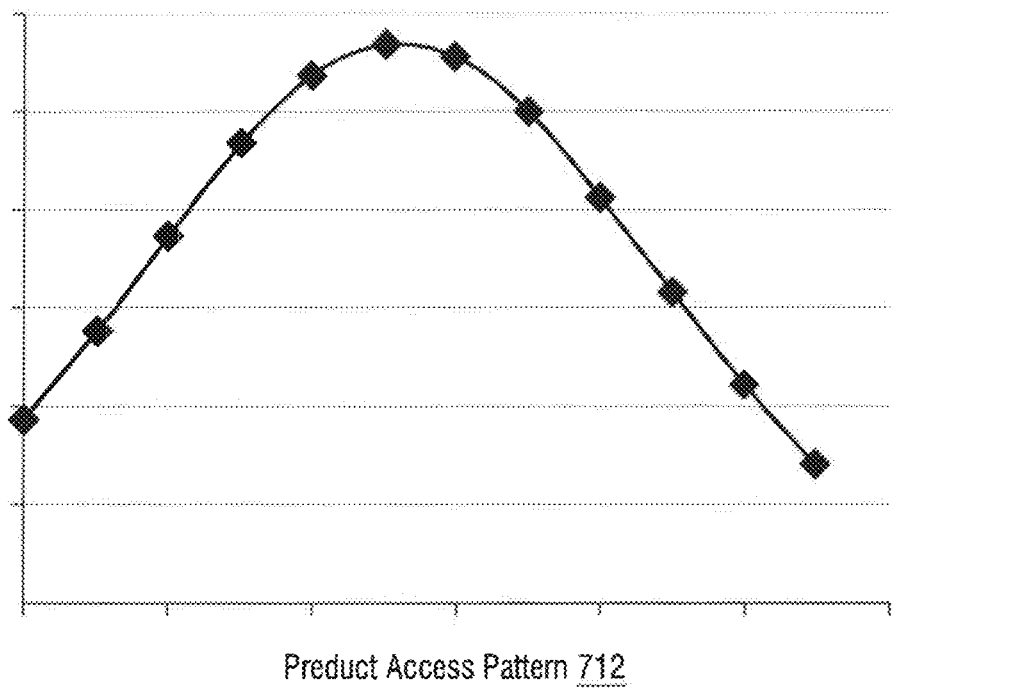
FIG. 9 is probability distribution representing a probability of accessing a file with respect to a future I/O request in a storage device, according to an exemplary embodiment of the inventive concept.

FIG. 9 is probability distribution representing a probability of accessing a file with respect to a future I/O request in a storage device, according to an exemplary embodiment of the inventive concept.

Based on the past and the current I/O requests that are received and processed, a probability distribution over a wide range of files including LBAs/blocks and pages is plotted that can be used to assist in optimizing the memory allocation and data caching policy of the storage device 124. For a given workload at the storage device 124, the frequency, mean, and standard deviation are inserted into a probability distribution function which may be used to predict and infer the access pattern of the particular file present in the storage device 124.

Further, by predicting the I/O request of the working set, the storage device 124 can pre-fetch data in read operations or optimize buffer allocations based on the access patterns for writes. Probability models such as Bayesian can be applied over the frequency information collected for each file/working set and using the distribution model probabilities of next possible locations and sizes of the I/O request can be determined.

While the present inventive concept has been particularly shown and described with reference to exemplary embodiments thereof, it will be understood by those of ordinary skill in the art that various changes in form and detail may be made therein without departing from the spirit and scope of the present inventive concept as defined by the following claims.

Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structures and methods described herein may be embodied using transistors, logic gates, and electrical circuits, such as application specific integrated circuit.

What is claimed is:

1. A method for data allocation in a storage device, the method comprising:
    ascertaining hotness of a current Input/Output (I/O) request to access data in the storage device;
    determining a frequency of access for each logical block address (LBA) associated with the current I/O request and past I/O requests;
    determining an access pattern for each LBA based on the determined frequency of access for each LBA;
    determining a hotness level and an access pattern for files in the storage device, by using the hotness of the current I/O request and the access pattern determined for each LBA; and updating an allocation of the data in the storage device based on the determined hotness level and access pattern for the files,
wherein ascertaining hotness of a current I/O request comprises:
retrieving metadata of the file associated with the request;
updating a frequency of access of an LBA in response to the current I/O request;
retrieving a maximum frequency of the file, the maximum frequency including a count of a maximum number of accesses attempted for a block among all blocks within the file;
retrieving a maximum frequency of a working set of files in the storage device, the maximum frequency of the working set including a highest frequency among the files within the working set; and
computing a hotness level of the current I/O request based on the updated frequency of access, and at least one of the maximum frequency of the file and the maximum frequency of the working set.

2. The method of claim 1, wherein the hotness of the current I/O request is obtained by using the working set of the files in the storage device, wherein the working set includes files that are requested through the current I/O request.

3. The method of claim 1, wherein ascertaining hotness of a current I/O request comprises:
extracting metadata of the file associated with the request;
determining a format of the file from the metadata; and
determining the hotness based on the format of the file.

4. The method of claim 3, further comprising:
ascertaining data as COLD when the format of the file is included in a COLD category.

5. The method of claim 1, further comprising:
dynamically updating the working set of files in the storage device, the working set including updated metadata of active files accessed by applications of a host system.

6. The method of claim 1, further comprising:
predicting a next I/O request based on the access pattern for files in the storage device and a probability distribution function of an LBA range.

7. The method of claim 1, further comprising:
queuing the I/O requests and associated metadata;
sending the metadata associated with each of the I/O requests in the order of the queue, the metadata including one or more statistical parameters; and
sending the I/O requests in the order of the queue.

8. The method of claim 1, wherein the method is performed in the storage device.

9. The method of claim 1, wherein the method is performed at a computing device connected to the storage device.

10. An apparatus for data allocation in a storage device, the apparatus comprising:
a processor;
a memory connected to the processor, the memory comprising a storage subsystem configured with one or more programs, wherein the storage subsystem is configured to instruct the processor to perform steps comprising:
ascertaining hotness of a current Input/Output (I/O) request to access data in the storage device;
determining a frequency of access for each logical block address (LBA) associated with the current I/O request and past I/O requests;
determining an access pattern for each LBA based on the determined frequency of access for each LBA;
determining a hotness level and an access pattern for files in the storage device, by using the hotness of the current I/O request and the access pattern determined for each LBA; and
updating an allocation of the data in the storage device based on the determined hotness level and access pattern for the files,
wherein in ascertaining hotness of a current I/O request, the storage subsystem instructs the processor to further perform the steps of:
retrieving metadata of the file associated with the request;
updating a frequency of access of an LBA in response to the current I/O request;
retrieving a maximum frequency of the file, the maximum frequency including a count of a maximum number of accesses attempted for a block within the file;
retrieving a maximum frequency of a working set of files in the storage device, the maximum frequency of the working set including a highest frequency among the files within the working set; and
computing a hotness level of the current I/O request based on the updated frequency of access, and at least one of the maximum frequency of the file and the maximum frequency of the working set.

11. The apparatus of claim 10, wherein the hotness of the current I/O request is obtained by using the working set of the files in the storage device, wherein the working set includes files that are requested through the current I/O request.

12. The apparatus of claim 10, wherein in ascertaining hotness of a current I/O request, the storage subsystem further instructs the processor to perform the steps of:
extracting metadata of the file associated with the request;
determining a format of the file from the metadata; and
determining the hotness based on the format of the file.

13. The apparatus of claim 10, wherein the storage subsystem instructs the processor to further perform the step of dynamically updating the working set of files in the storage device, the working set including updated metadata of active files accessed by applications of a host system.

14. The apparatus of claim 10, wherein the storage subsystem instructs the processor to further perform the step of:
predicting a next I/O request based on the access pattern for files in the storage device and a probability distribution function on an LBA range.

15. The apparatus of claim 10, wherein the storage subsystem instructs the processor to further perform the steps of:
queuing the I/O requests and associated metadata;
sending the metadata associated with each of the I/O requests in the order of the queue, the metadata including one or more statistical parameters; and
sending the I/O requests in the order of the queue.

16. The apparatus of claim 10, wherein the steps are performed in the storage device.

17. The apparatus of claim 10, wherein the steps are performed at a computing device connected to the storage device.

* * * * *